April 23, 1968 C. E. PETERS 3,379,858
ELECTRICALLY HEATED ARTICLE
Filed Oct. 7, 1965
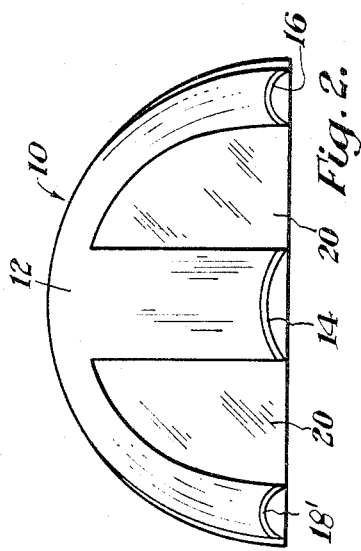
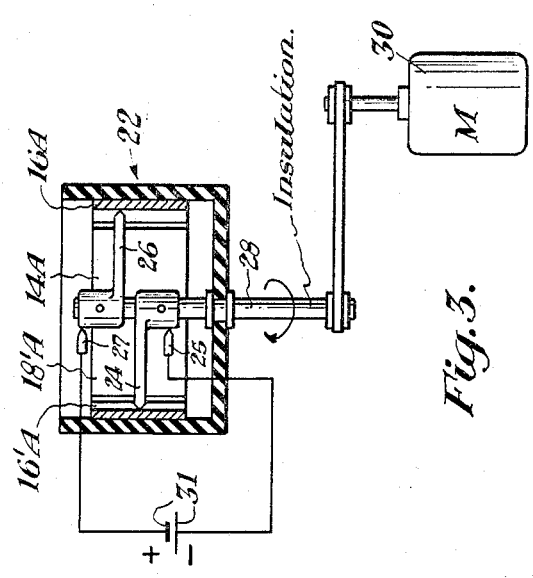
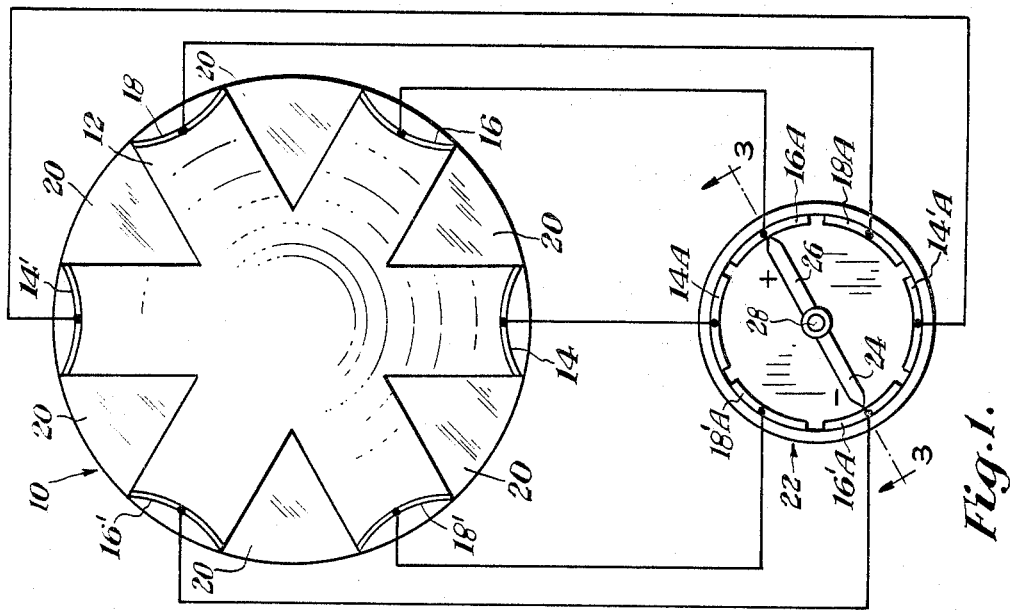
INVENTOR.
Carroll E. Peters.
BY
William D. Fosdick
AGENT

United States Patent Office 3,379,858
Patented Apr. 23, 1968

3,379,858
ELECTRICALLY HEATED ARTICLE
Carroll E. Peters, Painted Post, N.Y., assignor to Corning Glass Works, Corning, N.Y., a corporation of New York
Filed Oct. 7, 1965, Ser. No. 493,688
9 Claims. (Cl. 219—522)

The invention described herein may be practiced by or for the Government of the United States for governmental purposes without the payment of royalties therefor.

This invention relates to electrically conducting coatings, and more particularly to means and methods for supplying electrical power so as uniformly to heat conductive coatings of non-rectangular configuration.

It is well known to place electrically conducting coatings in nonconducting substrates, such as glass windows, and to heat the coatings by the passage of electrical currents therethrough for the purpose of preventing fogging or icing of the substrate. Such coatings may comprise, for example, thin coatings of metals, such as gold, or of metal oxides, such as tin oxide. Electrical power is supplied to the coatings along opposite edges thereof through bus bars comprising substances having electrical conductivities higher than those of the coatings. When the area to be heated is rectangular in form, heating can be effected by an electrically conducting coating formed over the entire rectangular area with bus bars placed along opposite parallel edges of the area. However, when the area to be heated is non-rectangular, the use of bus bars along opposed edges of the article results in uneven heating, inasmuch as the distance between the bus bars at various locations along the bars is not constant. The problem is particularly acute in the case of three-dimensional surfaces, such as, for example, hemispheric glass or plastic observation domes. Various expedients have been utilized to heat such non-rectangular areas, such as electrically conducting coatings of nonuniform thickness, according to the method of United States Patent 2,877,329, and segmented bus bars to which electrical power is concurrently supplied according to the method of United States Patent 2,843,713. The use of coatings of nonuniform thickness is subject to the difficulty inherent in producing coatings of precisely controlled thickness gradient. The use of segmented bus bars is not entirely satisfactory, inasmuch as nonuniform heating persists due to the nonparallelism of the bus bars.

Accordingly, it is an object of the present invention to provide a means and method for uniformly heating non-rectangular surfaces by means of electrically conducting coatings.

This and other objects, which will be apparent from the detailed description of the invention, are accomplished by the provision of a conducting coating with a plurality of pairs of bus bars and means for sequentially imposing an electrical potential between the bus bars of the respective pairs.

The invention will be described with reference to the accompanying drawing, in which:

FIGURE 1 is a schematic top plan view of a hemispheric glass dome having bus bars and a controlled power source according to the invention, FIGURE 2 is a side elevational view of the dome and bus bars of FIGURE 1, and FIGURE 3 is a sectional view taken on line 3—3 of FIGURE 1.

Referring to the drawing, hemispheric glass dome 10 is provided with a transparent oxide coating 12 extending in a pattern between paired silver bus bars 14 and 14', 16 and 16' and 18 and 18'. Coating 10 may comprise a mixture of tin and antimony oxides formed in accordance with the teaching of United States Patent 2,564,706. Between the coated areas of the hemisphere are a plurality of uncoated, electrically nonconducting areas 20. Electrical power is supplied to the paired bus bars in sequence, for example, between bus bars 14 and 14', then between bus bars 16 and 16', and subsequently between bus bars 18 and 18', by means of rotary switch 22, which comprises rotating electrical contacts 24 and 26 supported on insulating arm 28 and driven by means of motor 30. Electrical power is supplied to contacts 24 and 26 through brushes 25 and 27 from power source 31. Contacts 24 and 26 effect electrical connection successively between paired electrical poles 14A and 14'A, 16A and 16'A and 18A and 18'A, thereby imposing an electrical potential across the respective pairs of bus bars by means of the illustrated connecting wires. The effect of the sequential energizing of the conducting paths between the respective pairs of bus bars is to heat these areas repeatedly and in sequence.

The bus bars are curved so as to be convex in the direction of the center of the hemisphere. The curvatures of the bus bars are determined such that the distances along the hemisphere between corresponding points on the paired bus bars are substantially equal, thereby compensating for the sphericity of the conducting surfaces and providing uniform electrical paths between the bus bars in order to effect uniform heating of the areas therebetween. If such curvature were not present, due to the longer electrical paths at the center of the coated areas, there would be slightly less heating at the center of the hemisphere than at other coated locations. For applications where lesser degress of uniformity in heating are required, the bus bars may have other configurations.

Electrically insulating areas 20 are provided in order to prevent the passage of current from one bus bar to the remaining bus bar of the same pair through a path which includes the other bus bars along the periphery of the hemisphere. If the insulating areas were not present, in certain configurations, due to the high conductivity of the bus bars, the total resistance along the periphery of the hemisphere would sometimes be less than the total resistance between the paired bus bars, thereby causing most of the current to flow along the periphery, and thereby supplying most of the available heat energy to the periphery of the hemisphere. Although no current flows through the insulating area, sufficient heat is conducted thereto from the electrically heated coated areas to maintain the insulating areas at desired temperatures.

It will be appreciated that the precise number of bus bars utilized, as well as the size and shape of the bus bars and the sizes and conductivities of the electrically-conducting areas between the bus bars may vary and will depend upon the configuration of the article to be heated, the temperature at which it is desired to maintain the article and the ambient conditions to which the article is subjected. Electrical power may be supplied to the respective pairs of bus bars in immediate succession, or time delays may be imposed between the activation of the respective pairs, depending upon the degree of heating desired. Furthermore, electrical current may be passed between the paired electrodes in various sequences, i.e., it is not necessary that electrical power be applied to bus bars progressively in one direction along the periphery of the article. As long as the currents are caused to flow at different times, the order of the sequence may vary, and may, in fact, be random. The use of the term "sequence" and variations thereof, in the appended claims is to be construed accordingly.

By way of example, when glass hemisphere 10 has a diameter of 8 inches the bus bars may be approximately 3 inches in length and ⅛-inch in width. When such bus bars are spaced at equal intervals along the periphery of the hemisphere, the metallic coating has a resistivity of 30 ohms per square and a potential of 115 volts is applied across the paired bus bars, the resultant heat is sufficient to deice the hemisphere under extreme environmental tests and to maintain temperature variation to ±10° when the bus bars are activated in immediate succession at the rate of one cycle per minute.

When articles of irregular configuration are to be heated, the distances between the paired bus bars will vary from one pair to another. In such instances it is preferable to supply power to the more closely spaced bus bars for times shorter than the times for which power is supplied to the more widely separated bus bars.

The foregoing has been provided solely as a description of a preferred embodiment of the invention. It is therefore intended that the scope of the invention be limited not by the foregoing example, but rather only by the scope of the appended claims.

I claim:

1. An electrically conducting article comprising a base, a plurality of undependent pairs of spaced bus bars, an electrically-conducting coating upon said base extending between the two bus bars within each said pair of bus bars and in electrical contact therewith, said bus bars being of higher electrical conductivity than said coating, and means for sequentially passing electrical currents between said bus bars and the other bus bars of the same pairs.

2. An electrically conducting article according to claim 1 in which said electrically-conducting coating is formed on a surface of said base which surface is in the form of a portion of a sphere, and the two bus bars of each pair are convexly curved in the direction of one another.

3. An electrically conducting article according to claim 1 in which said electrically-conducting coating comprises a mixture of tin oxide and antimony oxide.

4. An eletrically conducting article according to claim 1 in which said base comprises glass.

5. An electrically conducting article comprising a glass base in the form of a portion of a sphere, a plurality of pairs of bus bars, an electrically-conducting coating upon said base extending between the two bus bars within each said pair of bus bars and in electrical contact therewith, the electrical conductivities of said bus bars being higher than that of said coating, said bus bars within each said pair being curved in the direction of one another and being located substantially along the periphery of said base, and means for sequentially passing an electrical current between said pairs of bus bars.

6. An electrically conducting article according to claim 5 in which said electrically-conducting coating comprises a mixture of tin oxide and antimony oxide.

7. The method of heating an article which comprises passing electrical current in sequence along a plurality of paths through at least one electrically-conducting coating on said article.

8. The method of supplying heat to a non-rectangular article which comprises maintaining at least one electrically-conducting coating on a surface of said article and passing electrical current in sequence between paired bus bars in electrical contact with said coating and of higher electrical conductivity than that of said coating.

9. An electrically conducting article comprising a hollow transparent base, said base having a periphery provided with a plurality of independent pairs of bus bars, the bus bars within each said pair being generally on opposite sides of said base, an electrically conducting coating on said base extending between the two bus bars within each said pair of bus bars and in electrical contact therewith, the electrical conductivities of said bus bars being higher than that of said coating, and means for sequentially passing an electric current through the coating between the two bus bars of each respective independent pair of bus bars.

References Cited

UNITED STATES PATENTS

| | | |
|---|---|---|
| 2,389,360 | 11/1945 | Guyer et al. |
| 2,688,679 | 9/1954 | Schleuning _____ 338—309 X |
| 2,843,713 | 7/1958 | Morgan _____ 219—543 |
| 2,994,848 | 8/1961 | Rayburn _____ 338—308 X |
| 3,092,704 | 6/1963 | DeWoody et al. ___ 338—309 X |
| 3,195,026 | 7/1965 | Wegner et al. _____ 338—325 X |
| 3,217,281 | 11/1965 | Griest et al. _____ 338—309 |

RICHARD M. WOOD, *Primary Examiner.*

V. Y. MAYEWSKY, *Assistant Examiner.*